US 6,713,982 B2

(12) United States Patent
Burse

(10) Patent No.: US 6,713,982 B2
(45) Date of Patent: Mar. 30, 2004

(54) SEGMENTED INDUCTION ELECTRIC MACHINE WITH INTERDIGIATED DISK-TYPE ROTOR AND STATOR CONSTRUCTION

(75) Inventor: Ronald Odell Burse, Ocean Springs, MO (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 2 days.

(21) Appl. No.: 10/077,278

(22) Filed: Feb. 15, 2002

(65) Prior Publication Data

US 2002/0117991 A1 Aug. 29, 2002

Related U.S. Application Data

(60) Provisional application No. 60/270,032, filed on Feb. 20, 2001.

(51) Int. Cl.[7] .......................... H02K 16/00; H02K 1/00
(52) U.S. Cl. ...................... 318/538; 310/114; 310/268
(58) Field of Search .................... 318/538; 310/112, 310/114, 124, 140, 184, 237, 254, 261, 264, 268

(56) References Cited

U.S. PATENT DOCUMENTS

| 3,346,796 | A | 10/1967 | Avey |
| 3,401,284 | A | 9/1968 | French |
| 3,401,285 | A | 9/1968 | French et al. |
| 3,401,286 | A | 9/1968 | French |
| 3,401,287 | A | 9/1968 | French et al. |
| 3,401,288 | A | 9/1968 | French |
| 3,401,323 | A | 9/1968 | French |
| 3,436,571 | A | 4/1969 | French |
| 3,543,066 | A | 11/1970 | French |
| 3,700,944 | A | 10/1972 | Heintz |
| 3,757,147 | A | * 9/1973 | Lyman, Jr. .................... 310/49 |
| 3,855,486 | A | * 12/1974 | Binder et al. .................. 310/49 |
| 4,187,441 | A | * 2/1980 | Oney .......................... 310/112 |
| 4,371,801 | A | * 2/1983 | Richter ....................... 310/156 |
| 4,691,133 | A | * 9/1987 | Mongeau ..................... 310/178 |
| 4,874,974 | A | 10/1989 | Wu |
| 4,996,457 | A | 2/1991 | Hawsey et al. |
| 5,028,830 | A | 7/1991 | Mas |
| 5,177,392 | A | * 1/1993 | Scott .......................... 310/268 |
| 5,396,140 | A | 3/1995 | Goldie et al. |
| 5,397,953 | A | 3/1995 | Cho |
| 5,942,830 | A | 8/1999 | Hill |
| 6,206,739 | B1 | 3/2001 | Dadd et al. |

FOREIGN PATENT DOCUMENTS

| GB | 2 139 821 A1 | 11/1984 |
| GB | 2 358 740 A | 8/2001 |
| WO | WO 95 11514 A | 4/1995 |

* cited by examiner

Primary Examiner—Bentsu Ro

(57) ABSTRACT

The present invention relates to an A. C. electrical machine comprising: a plurality of disk-shaped annular stator elements stacked and spaced equidistantly from each other and mounted on a frame; a plurality of disk-shaped rotor elements mounted on a rotational axis and spaced equidistantly from each other such that successive rotor elements are positioned between successive stator elements; a plurality of electrical windings on each of the first stator elements, which when energized with a current flow, produce a magnetic field in a direction substantially parallel to the axis; and a return path for completing a magnetic flux path in a second direction perpendicular to the first direction on successive stator elements and through the rotor elements for generating a rotational force in the rotor elements.

15 Claims, 9 Drawing Sheets

SEGMENTED INDUCTION ELECTRIC MACHINE WITH INTERDIGIATED DISK-TYPE ROTOR AND STATOR CONSTRUCTION

The present invention relates to an electrical induction machine which uses a segmented coil construction to maximize active surface area of magnetic flux between rotor and stator elements, resulting in higher efficiency of flux utilization.

BACKGROUND OF THE INVENTION

Alternating current electric machines such as motors, transformers, and generators, are generally used because they are extremely rugged, reliable, easy to control, and in particular have a high torque capacity and high power density ratings. Induction machines operate on the principle that current traveling in stationary coils or windings of a stator produces a rotating magnetic field which in turn induces a current in a rotor occupying the space where the rotating magnetic field exists. The induced current in the rotor reacts with the rotating magnetic field to produce a rotational force.

Heretofore, it was believed that there was a fundamental limit to torque density in such machines. Although flux density is limited by material considerations, while current density is limited by (1) heating, (2) machine reactance, and (3) the fact that too much current density produces localized magnetic saturation, the present invention optimizes the configuration of the rotor and stator elements or primary and secondary elements so that the machine output can be increased without substantially increasing the volume of the machine. Conventional belief in the design of alternating current electric machines is that power density is limited and the only way to increase power output is to increase the volume of the machine.

The primary object of this invention is to provide an electrical machine having a high torque capacity for a given machine volume. A second object of this invention is to provide such an electrical machine in which the commonly accepted limit to torque density in electrical machines is overcome by utilizing the same magnetic flux among one or more parallel air gaps. A third object of this invention is to provide an electrical machine in which the magnetic flux is passed through multiple air gaps, inducing a surface current on the rotor at each air gap, thereby increasing the torque density for a give volume of the machine. A fourth object of this invention to provide such an electrical machine which may be operated as a rotary or synchronous machine. A fifth object of this invention to provide such an electrical machine in which force density is increased substantially by the number of air gaps present in the machine but the overall machine transverse dimension is increased only by a smaller factor because the magnetic return path remains nearly constant.

BRIEF SUMMARY OF THE INVENTION

The present invention is an alternating current (AC) electrical machine comprising:

(a) a stator having a plurality of stator elements in the form of annular disks, spaced apart from each other, each stator element comprising a plurality of magnetically isolated magnetic teeth;

(b) a rotor having a plurality of rotor elements mounted on a shaft, the rotor elements spaced from each other and interstitially disposed with the stator elements in an interdigitated manner;

(c) a plurality of electrical windings on each of the stator elements, each winding being associated with a group of magnetic teeth of the stator element, the windings being arranged such that, when energized with a current flowing in the windings, a magnetic flux is created in a first direction;

(d) means for completing a magnetic flux path in a second direction through corresponding groups of teeth on successive stator elements, and through the rotor elements.

The present invention may further comprise a modular control unit arranged to individually control electrical energy applied to each stator element, the control unit comprising:

(a) a microprocessor controller, a load sensing means and a plurality of stator control modules; each control module comprising an electrical switching device connected to a stator element; and wherein the microprocessor controller being responsive to the load sensing means to generate control signals to the control modules; and each control module being responsive to the control signals to control the flow of current to the connected stator element in a pulse-width control manner.

In the present invention each control module may further comprise current sensing means to sense current in the windings of the associated stator element and means to generate a corresponding signal to the microprocessor controller, the controller being responsive to the signal to compensate for the sensed current.

In the microprocessor controller of the present invention, the microprocessor controller may compare each current signal to a predetermined fault threshold to detect a winding fault and to cause that control module to deenergize the stator element in response to the detected fault, permitting the motor to continue to operate.

In the present invention, alternating current may be supplied from a multiphase source. The current sensing means is arranged to sense current in each individual phase, in each stator element winding. There is also a means to generate a corresponding sensing signal to the microprocessor controller. The controller is responsive to the sensing signal and generates control signals to the control modules to equalize the current in each phase of the stator windings. When current is supplied in this way, the microprocessor controller may compare each current sensing signal from each phase in the winding of each stator element to a predetermined fault threshold to detect a winding fault in a stator element, and cause the control module connected to that stator element to deenergize the stator element in response to the detected fault, permitting the motor to continue to operate.

In the present invention the load sensing means may comprise a motor speed sensor. The load sensing means may comprise a torque sensor.

In the present invention the rotor element may further comprise a plurality of radial grooves, the radial grooves causing air to move radially between adjacent rotor and stator elements to facilitate dissipation of heat generated within the rotor elements and the stator elements.

In the present invention, the housing may be constructed to facilitate airflow through the housing, or the housing may be of sealed, gas-tight construction.

Another embodiment of the present invention is a transformer comprising a primary, a secondary and a soft iron core, the primary having a plurality of elements, each element being spaced apart from each other, and each element being in the form of an annular disk, each annular disk comprising a plurality of magnetically isolated magnetic teeth having wound thereon a plurality of electrical windings, the windings of each element of the primary being the same as any other element of the primary and;

the secondary having a plurality of elements, each element being spaced apart from each other, and each element being in the form of an annular disk, each annular disk comprising a plurality of magnetically isolated magnetic teeth having wound thereon a plurality of electrical windings, the windings of each element of the secondary being the same as any other element of the secondary; and wherein the elements of the primary and the elements of the secondary are mounted on the soft iron core so that the elements of the secondary are spaced from each other and interstitially disposed with the elements of the primary in an interdigitated manner.

The transformer of the present invention may further comprise a modular control unit arranged to individually control electrical energy applied to each element of the primary and each element of the secondary, the control unit comprising:

a microprocessor controller, a load sensing means and a plurality of control modules;

each control module comprising an electrical switching device connected to either a primary or a secondary element;

the microprocessor controller being responsive to the load sensing means to generate control signals to the control modules;

each control module being responsive to the control signals to control the flow of current to the connected primary element in a pulse-width control manner and to connect the secondary elements to a load. In addition each control module may further comprise current sensing means to sense current in the windings of the associated element and means to generate a corresponding signal to the microprocessor controller, the controller being responsive to the signal to compensate for the sensed current.

BRIEF DESCRIPTION OF THE DRAWING(S)

FIG. 1 shows a representative assembly overview of shaft, rotor disks, stators and housing of the present invention.

FIG. 2A and B show a segmented stator construction of the present invention.

FIG. 3 shows an exemplary arrangement of a 3-phase winding of stator elements of the present invention.

FIGS. 4A, B and C show an exemplary arrangement of a rotor element construction of the present invention.

DETAILED DESCRIPTION OF THE INVENTION

Figure 1:
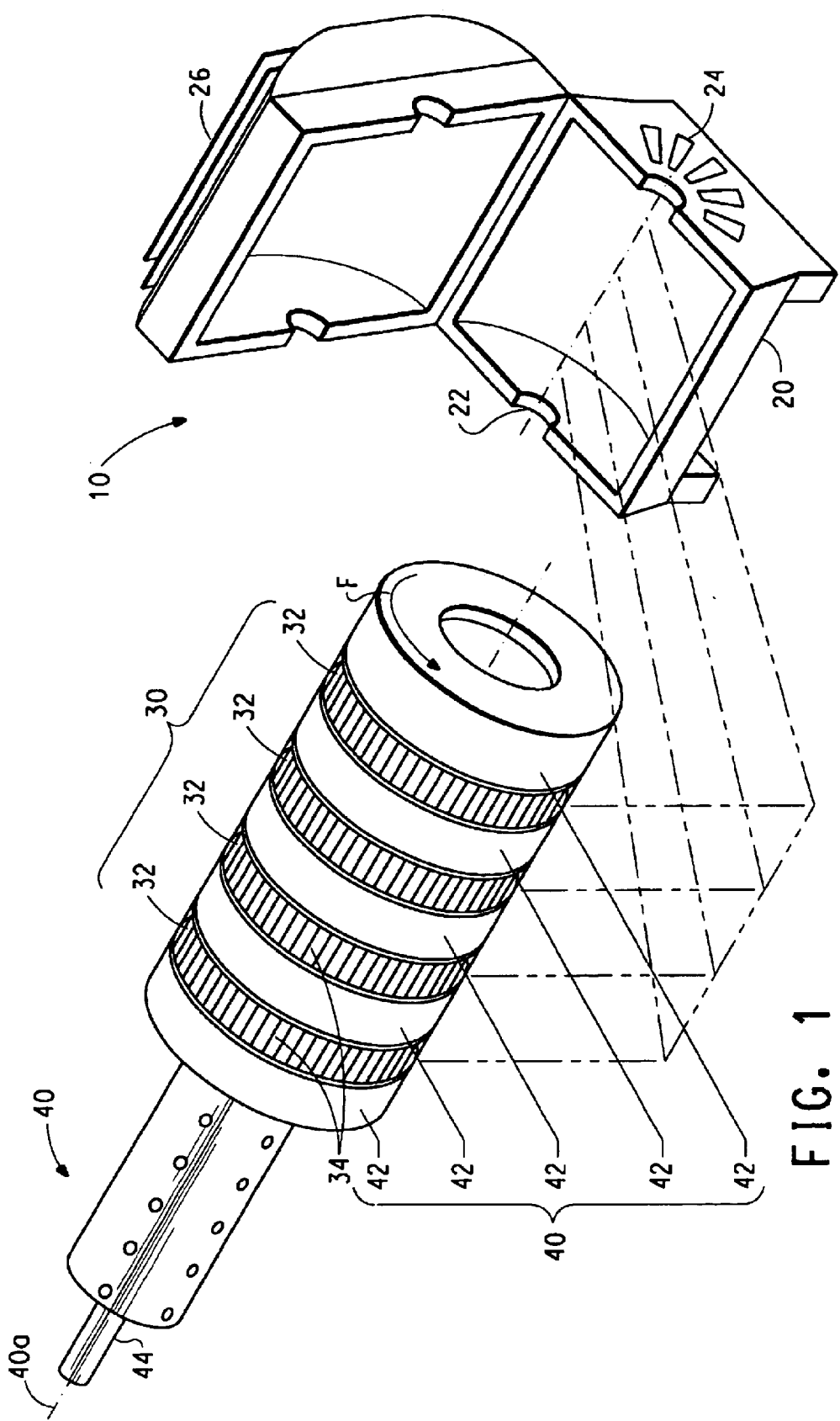

The present invention is an alternating current electrical machine having a novel arrangement of rotor and stator to produce increased torque compared to a conventional machine design, yet in a machine that is smaller in size than a conventional machines. The inventor believes that this increase in output/decrease in size is accomplished by passing the same magnetic flux created by the stator through multiple air gaps and interacting the magnetic flux at each gap with a surface current induced in a adjacent rotor element, so that the force density is multiplied by the number of gaps.

The present invention offers the following advantages over conventional designs:

(1) Improved efficiency: The power output is maximized by optimizing the cross-sectional area of magnetic flux interaction between the stator and the rotor. This results in an increase of magnetic energy transfer and improved efficiency compared to conventional machines. Due to the increased magnetic energy transfer, less electrical power will be required to produce the same amount of mechanical power compared to prior art machines. Unlike prior art designs, the present invention utilizes independent stator elements and a split motor housing design, allowing individual segments of the stator to be removed and replaced, facilitating easier maintenance.

(2) Enhanced Control Capability: The motor design includes an integral microprocessor-based electronic switching device which allows control of each individual stator element. This feature allows the motor to run at a constant speed with the optimal horsepower rating for a given load. Motor locked-rotor and in-rush currents are reduced compared to conventional designs. Due to the utilization of the individual stator element control, the motor can be started at a lower horsepower rating, resulting in further reduction of locked-rotor and in-rush currents.

(3) Reductions in Size, Weight and Cost: The machine of the present invention can be smaller than conventional motors of an equivalent horsepower rating. The segmented design permits the manufacture of standardized modules of stator elements and rotor elements. By varying the number of modules which are assembled, machines of various sizes and power ratings may be achieved. The manufacture of interchangeable modules can reduce costs.

The present invention is exemplified by the Figures. As may be seen in FIG. 1 the electrical machine 10, also referred to as motor 10, of the present invention comprises a housing 20, a stator 30 mounted in the housing, and a rotor 40, the rotor 40 having an axis 40A therethrough and being supported in the housing 20 by bearings 22 for rotation about the axis 40A The stator 30 has a plurality of stator elements 32 in the form of annular disks, spaced apart from each other, each stator element comprising a plurality of magnetically isolated magnetic teeth 36 (see FIG. 3).

The rotor 40 has a plurality of rotor elements 42 mounted on a shaft 44, the rotor elements 42 being spaced from each other and interstitially disposed with the stator elements 32 in an interdigitated manner.

Figure 3:
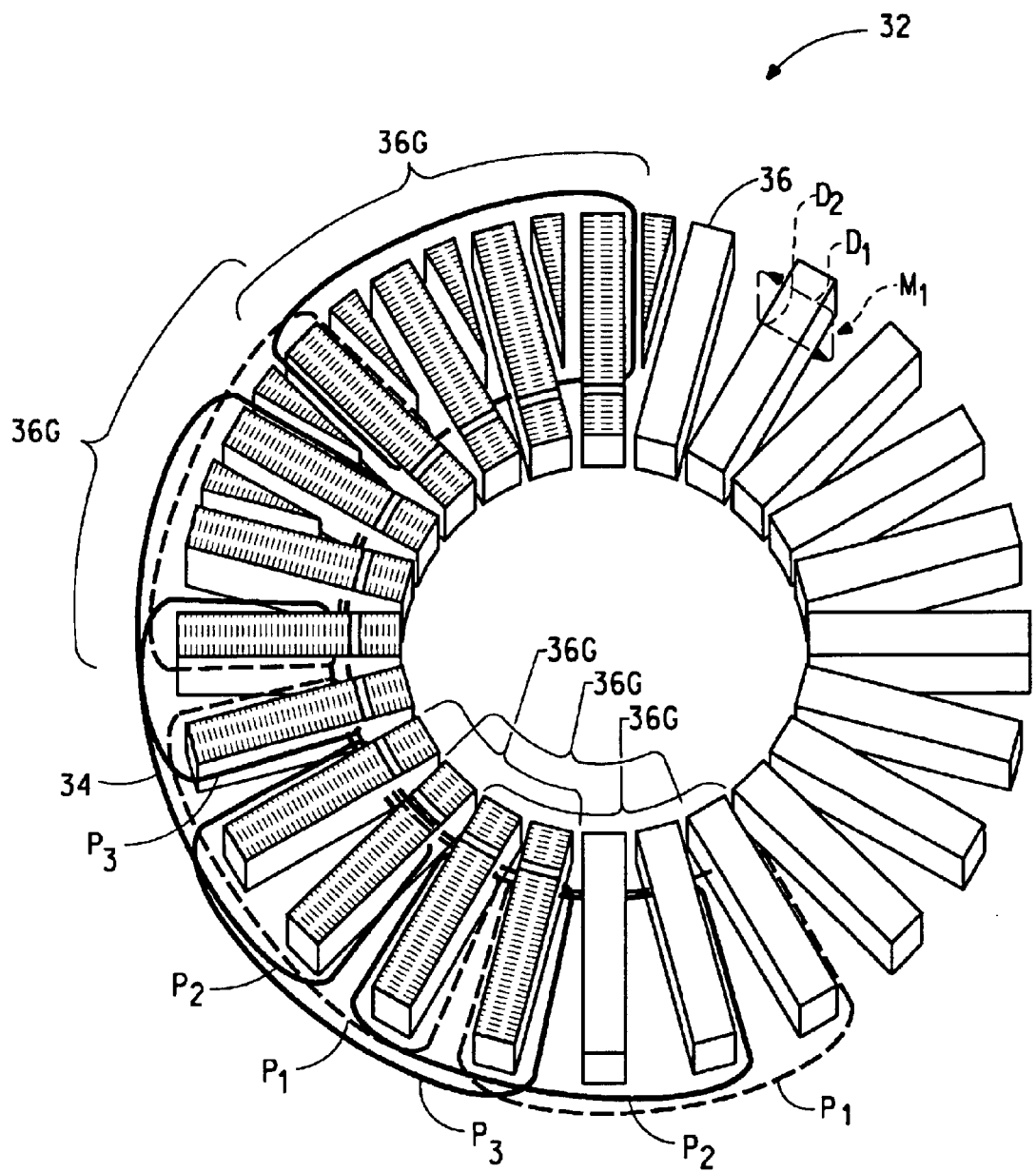

As may best be seen in FIG. 3, each of the stator elements 32 has a plurality of electrical windings 34, each winding 34 being associated with a group 36G of magnetic teeth 36 of the stator element 32, the windings 34 being arranged such that, when energized with a current C flowing in the windings 34, a magnetic flux $M_1$ is created in a first direction $D_1$. It should be noted that some of the wedge-shaped stator element components have been omitted so that the windings 34 may be better seen.

The magnetic flux path is completed in a second direction $D_2$ through corresponding groups 36G of teeth 36 on successive stator elements 32, and through the rotor elements 42, thereby inducing currents $C_1$ in the rotor elements 42, resulting in a rotational force F being applied to the rotor elements 42 causing the rotor 40 to rotate as shown in FIG. 1.

Figure 6:
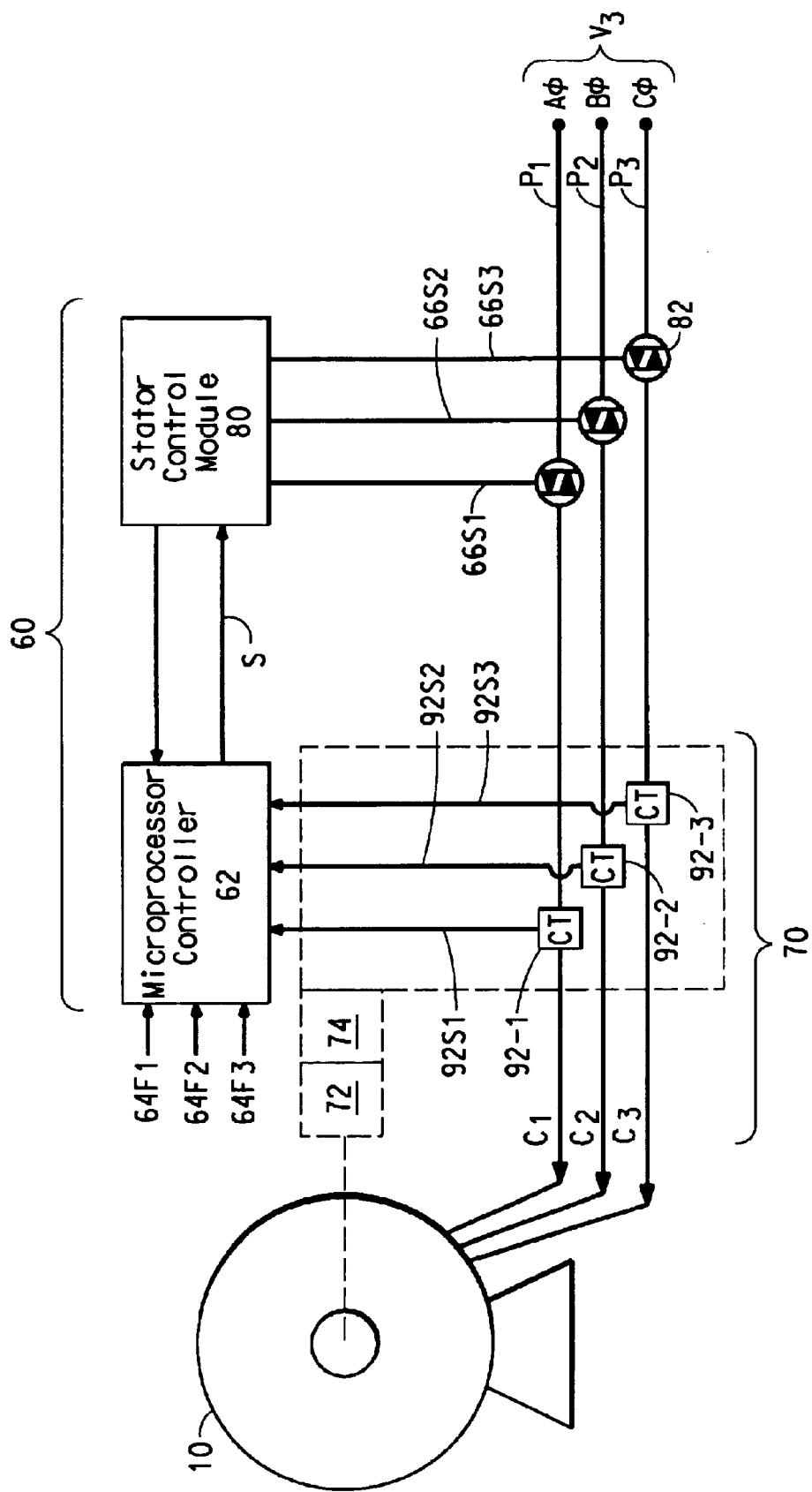
FIG. 6 shows a control arrangement for a motor of the present invention.

As may be seen in FIG. 6, the electrical machine 10 further comprises a modular control unit 60 arranged to individually control electrical energy applied to each stator element 32. The control unit 60 comprises a microprocessor controller 62, a load sensing means 70 and a plurality of stator control modules 80.

Each control module 80 comprises an electrical switching device 82 connected to the winding 34 of a stator element 32. Suitable electrical switching devices include triac control assemblies, isolated gate bias transistors (IGBT) and similar devices. The microprocessor controller 62 is responsive to the load sensing means 70 to generate control signals S to the control modules 80. The load sensing means 70 may comprise a motor speed sensor 72 or a torque sensor 74. Each control module 80 is responsive to the control signals S to control the flow of current C to the connected stator element 32 in a pulse-width control manner, thus causing the rotor 40 to rotate at a constant speed with a power output proportional to the load.

Each control module 80 further comprises current sensing means 90 to sense current C in the windings 34 of the associated stator element 32 and means 92 to generate a corresponding signal 92S to the microprocessor controller 62, the controller being responsive to the signal 92S to compensate for the sensed current C.

The microprocessor controller 62 compares each current signal 92S to a predetermined fault threshold 64F to detect a winding fault. When a winding fault is detected the microprocessor controller 62 sends a control signal S to that control module 80 to deenergize the stator element 32 in response to the detected fault, permitting the motor 10 to continue to operate.

The alternating current power supplied to the control module 80 and then to the motor 10 may be from a single phase source $V_1$ or from a multiphase source $V_M$. Although the multiphase source $V_M$ may comprise any number of phases, typically a three-phase source $V_3$ is recommended for use. When a multiphase source $V_M$ is used the current sensing means 70 is arranged to sense current C1, C2, C3 in each individual phase P1, P2, P3 in each stator element winding 34. Signal generating means 92-1, 92-2, 92-3 generate corresponding sensing signals 92S1, 92S2, 92S3 to the microprocessor controller 62. The controller 62 is responsive to the sensing signal 92S to generate control signal S signal to the control modules 80, which in turn generate signals 66S-1, 66S2, 66S3 to the switching devices 82 to equalize the current C1, C2, C3 in each phase of the stator windings 34.

The microprocessor controller 62 compares each current sensing signal 92S1, 92S2, 92S3 from each phase in each stator element to a predetermined fault threshold 64F1, 64F2, 64F3 to detect a winding fault in a stator element 32, and causing the control module 80 connected to that stator element 32 to deenergize that the stator element 32 in response to the detected fault, permitting the motor 10 to continue to operate.

Figure 5:
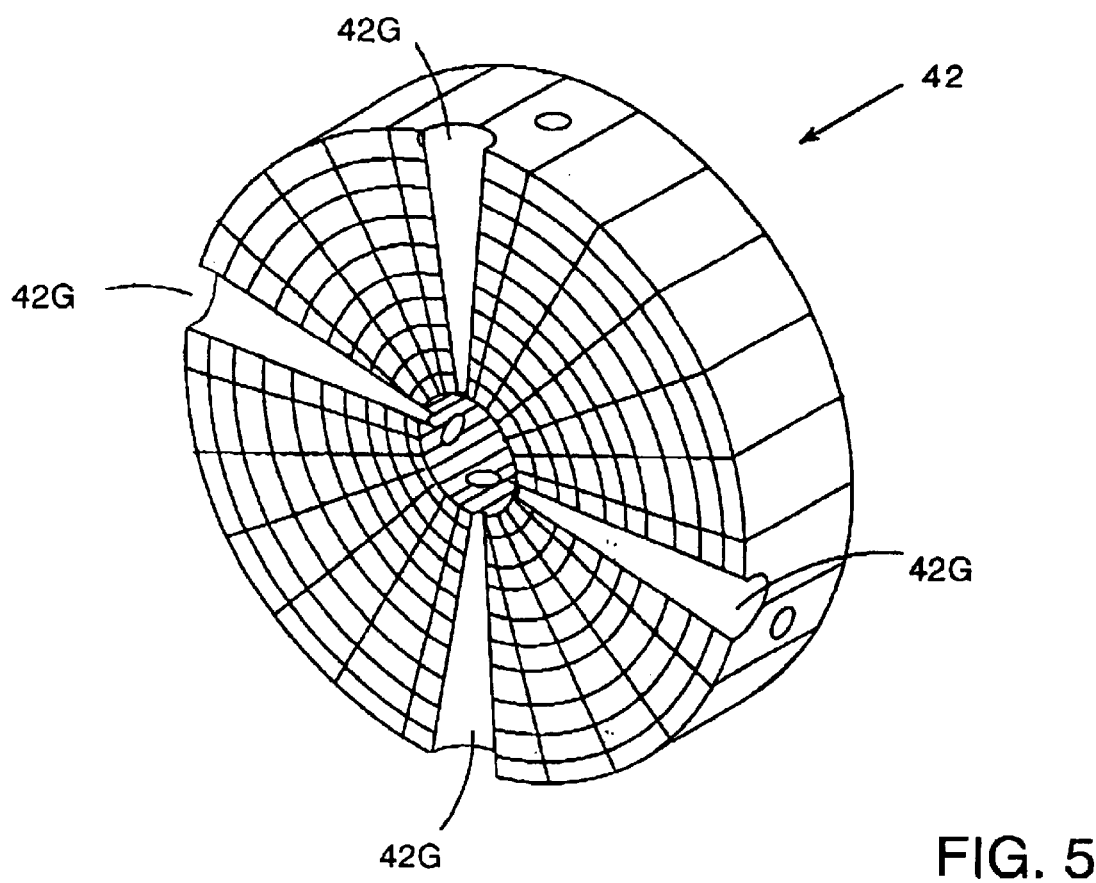
FIG. 5 shows the radial grooves of a rotor element.

As may be seen in FIG. 5, each rotor element 42 further comprises a plurality of radial grooves 42G, the radial grooves causing air to move radially between adjacent rotor elements 42 and stator elements 32 to facilitate dissipation of heat generated within the rotor elements 42 and the stator elements 32. This adaptation of the present invention may be useful in providing a means of cooling the machine. The meaning of the term "housing constructed to facilitate airflow" includes fans and other devices or configurations that accomplish cooling. For example fan assemblies used in conventional motors or generators may also be used in the present invention.

For general-purpose applications in dry conditions, the housing 20 of the motor 10 may be constructed with openings 24 disposed to facilitate airflow through the housing 20 to dissipate heat generated. For applications in wet conditions or where explosion-proof construction is required, the housing 20 may be constructed in a sealed, water-tight or gas-tight manner. For such adverse condition applications conventional heat radiating elements 26 may be integrally formed in the housing 20 or attached to the housing.

As is best seen in FIG. 3, there are a plurality of electrical windings 34 on each stator element 32. Each of the windings surrounds a different group 36G of magnetic teeth 36. There are also return means including magnetic material for establishing a magnetic flux path axially in series through corresponding groups of teeth on successive stators and interstitial rotors, and azimuthally in the magnetic return means.

As is best seen in FIG. 3, there are a plurality of magnetically isolated magnetic teeth 36, 46 on each of the stator elements 32 and rotor elements 42. The number of teeth 36, 46 on each rotor element 42 may be different in number from the number of teeth 36 on each stator element. There are magnetic return means including magnetic material for establishing a low reluctance azimuthal flux path and a plurality of conductor paths surrounding the teeth on each of the rotors.

There are also a plurality of electrical windings 34 on each stator element 32. Each winding 34 surrounds a different group 36G of magnetic teeth for producing a magnetic flux axially in a path in series to corresponding groups of teeth 36G, 46G on successive stator elements and rotors elements, and returning azimuthally through the magnetic return means.

Figure 4A:
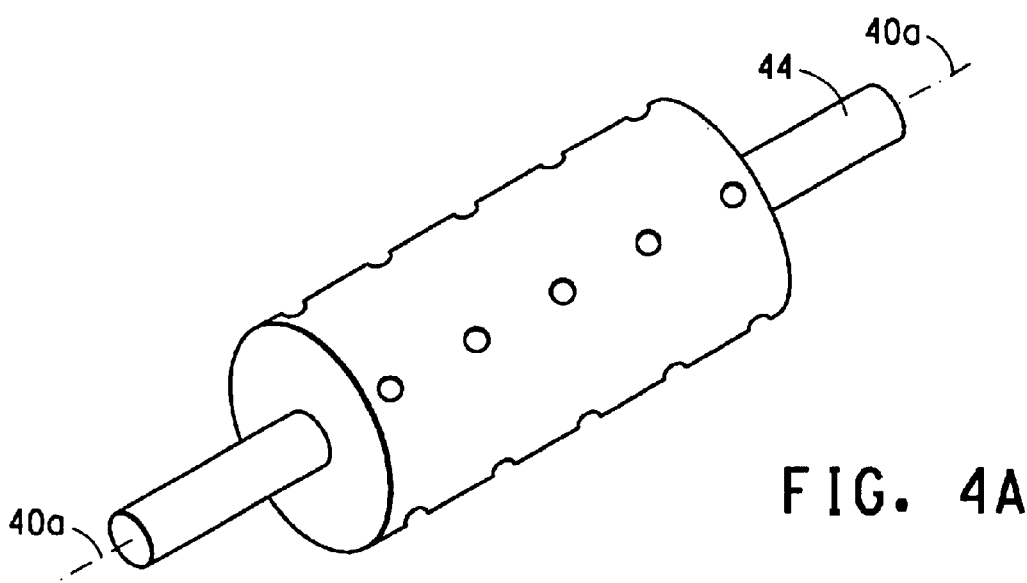
Figure 4B:
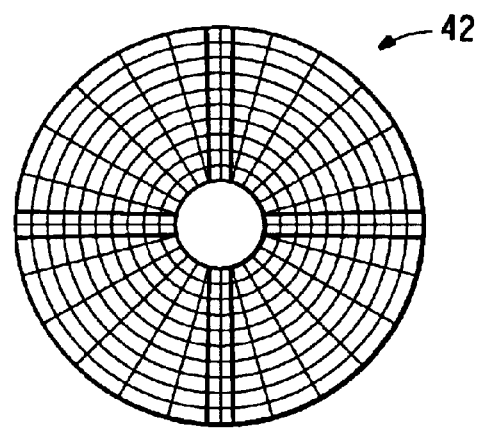
Figure 4C:
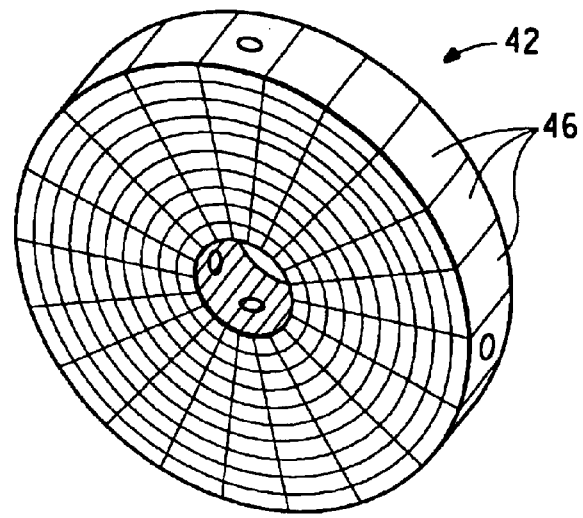

FIG. 3 shows a preferred embodiment of the stator elements 32, which are each in the form of an annular disk. FIGS. 4A, 4B and 4C show a preferred embodiment of the rotor elements 42, which are each in the form of a disk mounted on the shaft 44. The magnetic teeth 36 of the stator elements 32 are imbedded in the annular disks, and the annular disks are of laminated construction. In a similar manner the magnetic teeth 46 of the rotor elements 42 are imbedded in the disks, and the disks are of laminated construction. The number of magnetic teeth 36 on the stator elements 32 may be greater than the number of magnetic teeth 46 on the rotor elements 42.

Figure 2A:
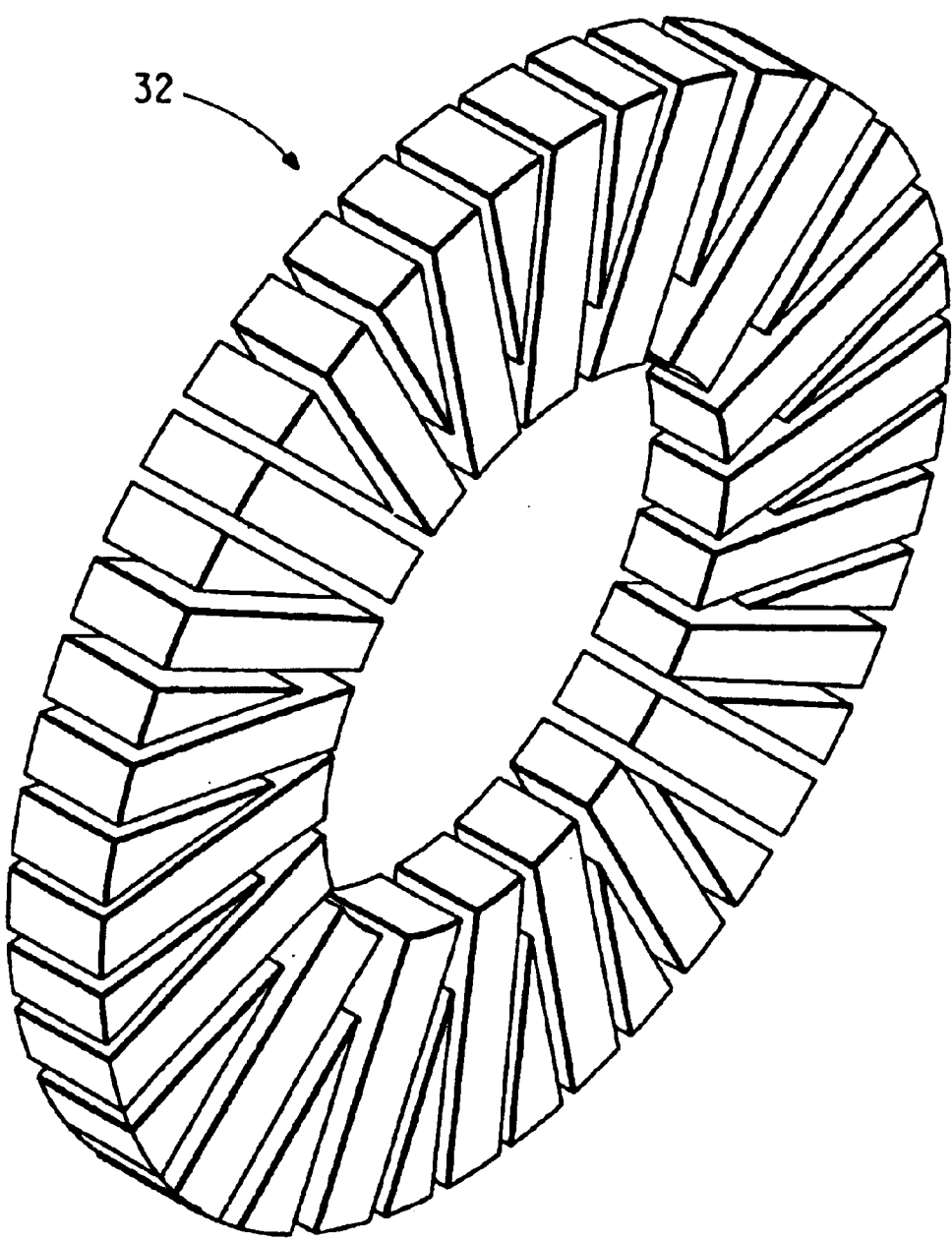
Figure 2B:
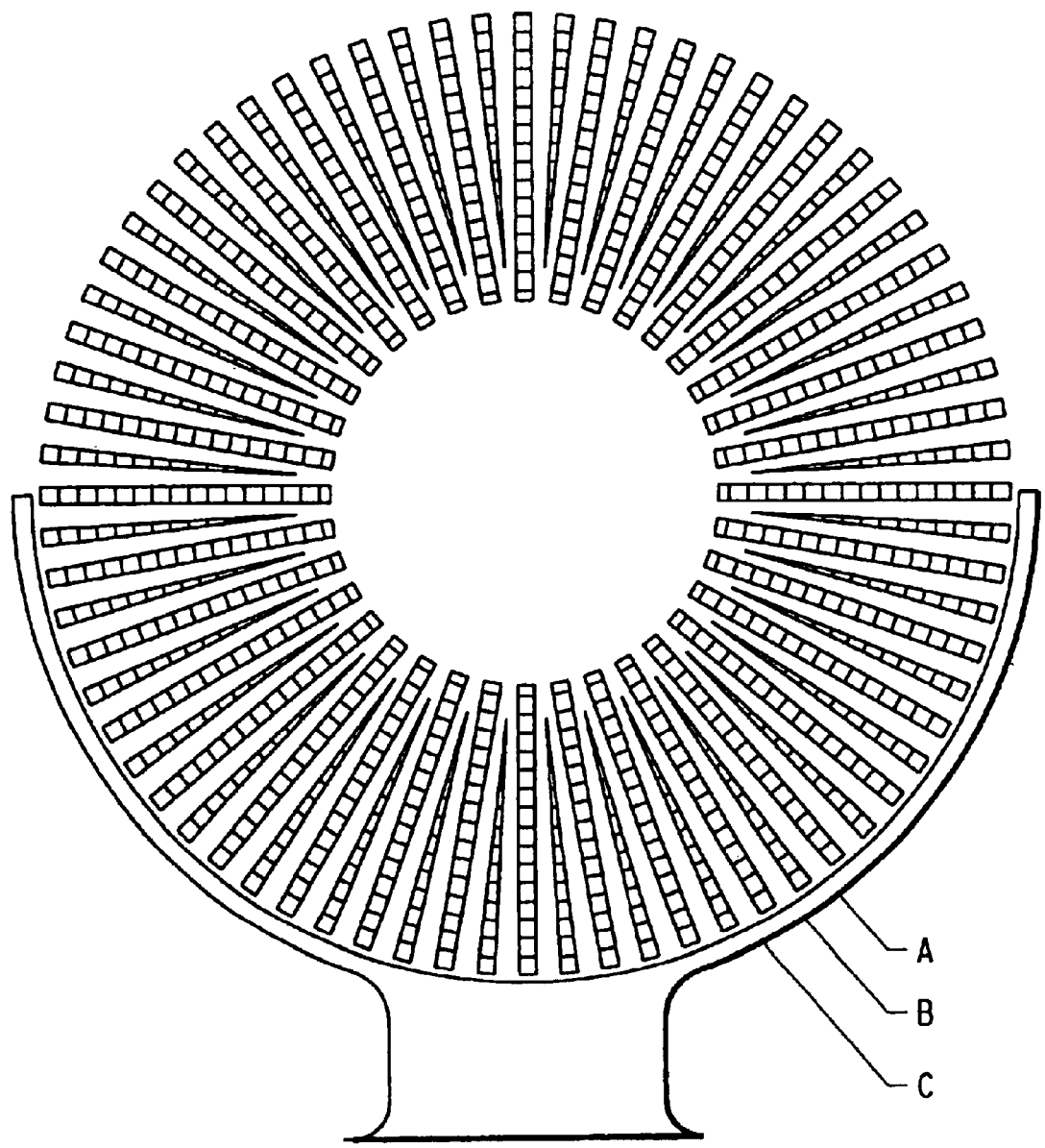

As seen in FIG. 1, there are a plurality of axially spaced stators 32 interstitially disposed with the rotors 42. Each stator 32 includes a plurality of magnetically isolated magnetic teeth. There are return means including magnetic material for establishing a low reluctance azimuthal flux path, and a plurality of electrical windings 34 on each stator 32. Each winding 34 surrounds a different group of magnetic teeth 36G. The stator 32 may be made of magnetic, conducting material. The rotor 42 may be made of conductive, magnetically permeable materials, along with nonconductive materials, for establishing magnetic teeth (FIG. 4). The magnetic teeth 46 of the rotor 42 may be constructed as shown in FIG. 2A or as shown in FIG. 4C. FIG. 5 shows a rotor element 42 having a plurality of grooves 42G for facilitating cooling of the rotor element.

The alternating current machine embodiment of the present invention may be used as a generator as is known for conventional electric motors. That is, the rotor shaft 40 may be turned by an external power source and electrical current produced may be directed to any desired use.

In the alternating current electrical machine of the present invention, or its use as a generator, as well as in the embodiments of the present invention as a transformer, materials of construction known and used in conventional designs of motors, generators, transformers and the like may be used.

In the present invention the various control means and electrical components for control may be assembled from electrical components known and used in conventional electrical control circuits. For example, the load sensing means 70, the generating means to generate a control signal or sensing signal, current sensing means of the present invention are preferred to be a control transformers (CT).

In the present invention, the specific geometric relationship of the rotor and stator elements (in motors and generators according to the present invention) and of primary and secondary units (in transformers according to the present invention) is unique. This unique segmented geometry not only provides advantages in the efficiencies of operation, but also unique advantages in the ease of manufacturing motors, generators, and transformers of the present invention.

Figure 7:
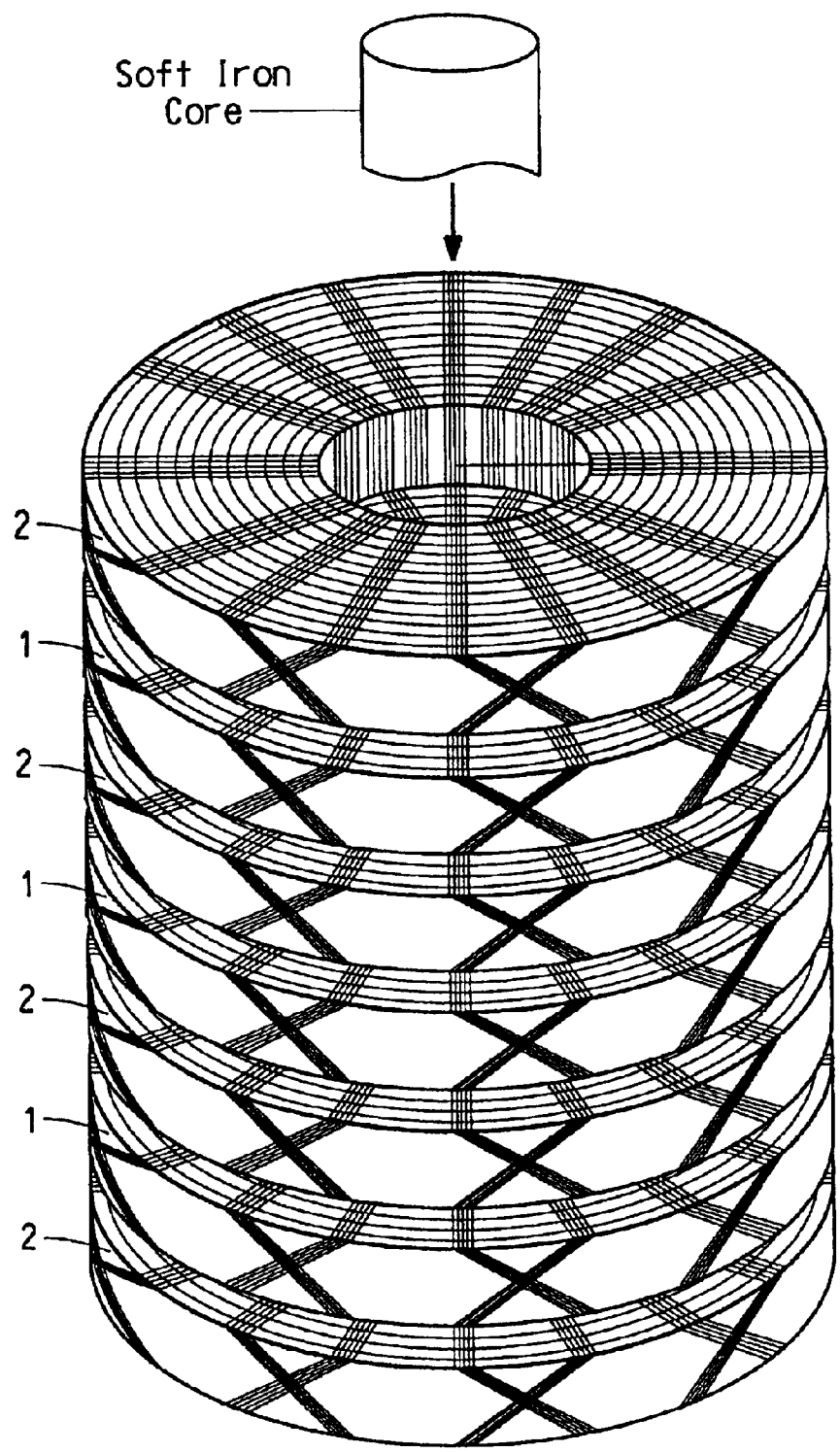
FIG. 7 shows the configuration of a transformer of the present invention where the elements of the primary 2 are sandwiched between the elements of the secondary 1.

Transformers according to the present invention comprise primary and secondary elements. The primary and the secondary are comprised of individual elements (similar in construction to stators in the motor/generator embodiment of the present invention) as previously illustrated in FIGS. 1–4. The advantages of the present invention are realized from the configuration of the individual elements of the primary and secondary in the transformer device. As an example consider a step-up transformer according to the present invention. FIG. 7 is an illustration of this example.

In FIG. 7, the transformer primary is comprised of individual elements 1. The transformer secondary is comprised of the individual elements 2. These elements are mounted on a soft iron core. Just as in a conventional transformer, current flowing into the windings of the primary induces current in the windings of the secondary. The step-up in the voltage is determined by the ratio of the number of turns of the primary windings to the number of turns of the secondary windings.

In a transformer of the present invention, the number of winding on each element of the primary is the same as is on any other element of the primary. The number of windings on each element of the secondary is the same as any other element of the secondary.

The configuration of the elements of the primary and secondarys in the present invention is that shown in FIG. 7. That is each of the primary elements is sandwiched between two of the secondary elements thus optimizing the magnetic flux permeation of the iron core and the magnetic circuit through each stator element thereby increasing the efficiency of power transfer from the primary to the secondary.

The separation of the transformer's primary and secondary into individual elements also allows for the use of modular control units for each of the primary and secondary elements, so that current output can be regulated according to demand. In this, the most preferred configuration of the present transformer (see FIG. 8), individual stator elements of the primary and secondary may be switched-out (electrically disconnected) at periods of low demand and switched-in (electrically connected) at periods of high demand. Thus, a transformer of the present invention may be sized for peak demand, but operated at or very near actual demand to minimize energy waste associated with the operation of conventional transformer. The term "sized for peak demand" means the total number of primary and secondary elements provided. The term "operated at or very near actual demand" means the number of primary and secondary elements that are electrically connected to the source and load, respectively.

Control modules for transformers according to the present invention are preferred to be similar to the control modules provided for the embodiment of the present invention as an alternating current electrical machine, described above.

Materials of construction for transformers according to the present invention include those materials known and used in conventional transformers.

The present invention provides motors and generators comprised of segmented stator and rotor elements and transformers comprised of segmented primary and secondary units. This use of segmented units results in a surprising ease of manufacturing and interchangeability electrical components for motors, generators and transformers of the present invention.

The present invention provides a method of manufacture and design of an alternating current electrical machine having a housing, a stator mounted in the housing, and a rotor, the rotor having an axis therethrough and being supported by bearings for rotation about the axis in the housing, the method comprising the steps of:

(a) selecting from a plurality of individual stator elements the number of stator elements necessary to produce the desired horsepower or kilowatt rating for the electrical machine wherein stator elements are in the form of annular disks comprising a plurality of magnetically isolated magnetic teeth, each stator element having thereon a plurality of electrical windings on each of the stator elements, each winding being associated with a group of magnetic teeth of the stator element, the windings being arranged such that, when energized with a current flowing in the windings, a magnetic flux is created in a first direction;

(b) selecting from a plurality of individual rotor elements necessary to produce the desired horsepower or kilowatt rating for the electrical machine;

(c) mounting the selected stator elements in the housing such that the elements are spaced apart from each other;

(d) mounting the selected rotor elements on the shaft such that the rotor elements spaced from each other and interstitially disposed with the stator elements in an interdigitated manner.

The alternating current electrical machine produced by this method may be used as a motor or a generator.

The present invention also provides a method of manufacture and design for a transformer having a primary and a secondary and a soft iron core, the method comprising the steps of;

(a) selecting from a plurality of individual elements to form the secondary, the number of elements being that necessary to produce the desired transformer power output wherein each element is in the form of an annular disk comprising a plurality of magnetically isolated magnetic teeth, each element of the secondary having wound a plurality of electrical windings, and each element of the secondary having the same number of windings;

(b) selecting from a plurality of individual elements to form the primary, the number of elements being that necessary to produce the desired transformer power output and one less element than the number of elements selected for the secondary, wherein each element is in the form of an annular disk comprising a plurality of magnetically isolated magnetic teeth, each element of the primary having wound thereon a plurality of electrical windings, each winding being associated with a group of magnetic teeth of the element, and each element of the primary having the same number of windings;

(c) stacking the elements of the secondary and the elements of the primary about the iron core such that the iron core passes through the annular space of the elements and so that the elements of the secondary are spaced from each other and interstitially disposed with the elements of the primary in an interdigitated manner.

A transformer of the present invention may be single or multiple phase.

Figure 8:
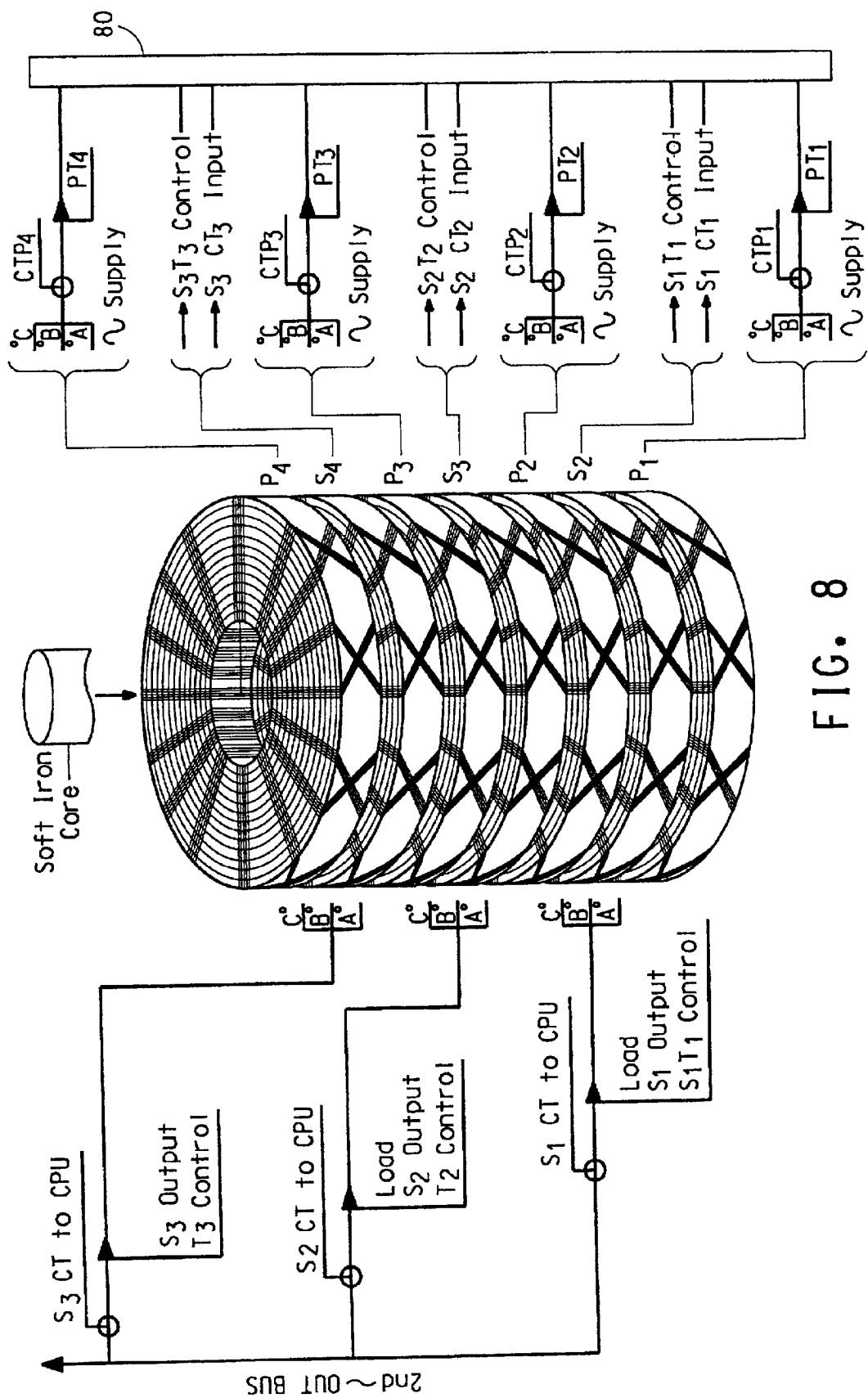
FIG. 8 shows a transformer of the present invention and modular control units for elements of the primary and secondary.

According to the present invention, the stator and the rotor in an alternating current electrical motor or generator, or the primary and secondary in a transformer may be made of a collection of individual elements arranged in a special geometry. For example, a transformer of the present invention is made of a stack of primary and secondary elements arranged so that each primary element is stacked between two secondary elements (FIGS. 7 and 8). The individual elements of the secondary are connected in a load circuit, and the individual elements of the primary are connected in a power source circuit. When modular controllers are included in the circuit connection to each element of the secondary and to each element of the primary, the maximum flexibility in transformer operation and output efficiency may be realized.

In the use of the present invention for a motor or generator, individual rotor elements and individual stator elements are stacked in a special geometry as is shown in FIG. 1 where each stator element is sandwiched between two rotor elements. Stator elements according to the present invention may be used to manufacture motor/generators or transformers.

Stator and rotor element combinations according to the present invention may be produced in selected sizes, for example 2, 5, 10 or 20 horsepower. To build a 40 horsepower motor, for example, one could select and stack two 20 horsepower stator rotor combinations, four 10 horsepower combinations, eight 5 horsepower combinations, or twenty 2 horsepower combinations.

This ability to combine combinations of simple elements or segments simplifies the manufacturing process. Motor, generators and transformers may be produced in an assembly line operation rather than by custom manufacture. The same element that serves as a stator in a motor or generator may be used as an element of the primary or secondary in a transformer.

Repairs are also simplified. For example, a motor/generator or transformer may be repaired by simply replacing a bad element with a good one. Field repairs may be possible in many situations. Parts inventories are simplified by the present invention in that simple stock parts can be manufactured and selected in combinations to produce the desired power out-put in a particular electrical machine or transformer.

What is claimed is:

1. An alternating current electrical machine having a housing, a stator mounted in the housing, and a rotor, the rotor having an axis therethrough and being supported by bearings for rotation about the axis in the housing, comprising:

the stator having a plurality of stator elements in the form of annular disks, spaced apart from each other, each stator element comprising a plurality of magnetically isolated magnetic teeth;

the rotor having a plurality of rotor elements mounted on a shaft, the rotor elements spaced from each other and interstitially disposed with the stator elements in an interdigitated manner;

a plurality of electrical windings on each of the stator elements, each winding being associated with a group of magnetic teeth of the stator element, the windings being arranged such that, when energized with a current flowing in the windings, a magnetic flux is created in a first direction;

means for completing a magnetic flux path in a second direction through corresponding groups of teeth on successive stator elements, and through the rotor elements;

a modular control unit arranged to individually control electrical energy applied to each stator element, the control unit comprising:

a microprocessor controller, a load sensing means and a plurality of stator control modules;

each control module comprising an electrical switching device connected to a stator element;

the microprocessor controller being responsive to the load sensing means to generate control signals to the control modules;

each control module being responsive to the control signals to control the flow of current to the connected stator element in a pulse-width control manner, thus causing the rotor to rotate at a constant speed with a power output proportional to the load.

2. The electrical machine of claim 1, each control module further comprising current sensing means to sense current in the windings of the associated stator element and means to generate a corresponding signal to the microprocessor controller, the controller being responsive to the signal to compensate for the sensed current.

3. The electrical machine of claim 2, the microprocessor controller comparing each current signal to a predetermined fault threshold to detect a winding fault and to cause that control module to deenergize the stator element in response to the detected fault, permitting the motor to continue to operate.

4. The electrical machine of claim 2, wherein the alternating current is supplied from a multiphase source, the current sensing means being arranged to sense current in each individual phase in each stator element winding, means to generate a corresponding sensing signal to the microprocessor controller, the controller being responsive to the sensing signal to generate control signals to the control modules to equalize the current in each phase of the stator windings.

5. The electrical machine of claim 4, the microprocessor controller comparing each current sensing signal from each phase in the winding of each stator element to a predetermined fault threshold to detect a winding fault in a stator element, and cause the control module connected to that stator element to deenergize the stator element in response to the detected fault, permitting the motor to continue to operate.

6. The electrical machine of claim 1, the load sensing means comprising a motor speed sensor.

7. The electrical machine of claim 1, the load sensing means comprising a torque sensor.

8. The electrical machine of claim 1, wherein each rotor element further comprises a plurality of radial grooves, the radial grooves causing air to move radially between adjacent rotor and stator elements to facilitate dissipation of heat generated within the rotor elements and the stator elements.

9. The electrical machine of claim 8, the housing being constructed to facilitate airflow through the housing.

10. The electrical machine of claim 8, the housing being of sealed, gas-tight construction.

11. The electrical machine of claims 1, 2, or 4 wherein the electrical machine is used as a motor.

12. The electrical machine of claims 1, 2, or 4 wherein the electrical machine is used as a generator.

13. A method of manufacture of an alternating current electrical machine having a housing, a stator mounted in the housing, and a rotor, the rotor having an axis therethrough and being supported by bearings for rotation about the axis in the housing, the method comprising the steps of:

(a) selecting from a plurality of individual stator elements the number of stator elements necessary to produce the desired horsepower or kilowatt rating for the electrical machine wherein stator elements are in the form of annular disks comprising a plurality of magnetically isolated magnetic teeth, each stator element having thereon a plurality of electrical windings on each of the stator elements, each winding being associated with a group of magnetic teeth of the stator element, the windings being arranged such that, when energized with a current flowing in the windings, a magnetic flux is created in a first direction;

(b) selecting from a plurality of individual rotor elements necessary to produce the desired horsepower or kilowatt rating for the electrical machine;

(c) mounting the selected stator elements in the housing such that the elements are spaced apart from each other;

(d) mounting the selected rotor elements on the shaft such that the rotor elements are spaced from each other and interstitially disposed with the stator elements in an interdigitated manner; and (e) connecting a modular control unit to each stator element, the modular control unit being arranged to individually control electrical energy applied to each stator element, the control unit comprising a microprocessor controller, a load sensing means connected to the stator element and a plurality of stator control modules, each stator control module being respectively connected to the electrical windings on each of the stator elements and responsive to the flow of current in said windings.

14. The method of claim 13 wherein the electrical machine manufactured is a motor.

15. The method of claim 13 wherein the electrical machine manufactured is a generator.

* * * * *